United States Patent
Yang

(10) Patent No.: US 11,593,019 B2
(45) Date of Patent: Feb. 28, 2023

(54) METHOD AND SYSTEM FOR INFORMATION STORAGE

(71) Applicant: Silicon Motion Technology (Hong Kong) Limited, Kowloon (HK)

(72) Inventor: Po-An Yang, Zhubei (TW)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 0 days.

(21) Appl. No.: 16/867,327

(22) Filed: May 5, 2020

(65) Prior Publication Data

US 2021/0263669 A1 Aug. 26, 2021

(30) Foreign Application Priority Data

Feb. 21, 2020 (TW) .................................. 109105736

(51) Int. Cl.
*G06F 3/06* (2006.01)
*G06F 11/14* (2006.01)
*G06F 11/34* (2006.01)
*G06F 11/30* (2006.01)

(52) U.S. Cl.
CPC .......... *G06F 3/0653* (2013.01); *G06F 3/0604* (2013.01); *G06F 3/067* (2013.01); *G06F 3/0611* (2013.01); *G06F 11/1471* (2013.01); *G06F 11/3034* (2013.01); *G06F 11/3409* (2013.01); *G06F 11/3476* (2013.01)

(58) Field of Classification Search
CPC .... G06F 3/0653; G06F 3/0611; G06F 3/0604; G06F 11/1471; G06F 11/3034; G06F 11/3409; G06F 3/067; G06F 11/3476
See application file for complete search history.

(56) References Cited

U.S. PATENT DOCUMENTS

| | | | |
|---|---|---|---|
| 2004/0128586 A1* | 7/2004 | Bahr | H04L 41/0233 |
| | | | 714/43 |
| 2014/0122806 A1 | 5/2014 | Lin et al. | |
| 2015/0163121 A1* | 6/2015 | Mahaffey | H04W 12/12 |
| | | | 707/687 |
| 2015/0338867 A1 | 11/2015 | Ng | |
| 2017/0219421 A1 | 8/2017 | Takahashi et al. | |
| 2019/0141072 A1* | 5/2019 | Sasaki | H04L 12/66 |
| 2019/0334770 A1* | 10/2019 | Xiang | H04L 41/5009 |

FOREIGN PATENT DOCUMENTS

| | | |
|---|---|---|
| CN | 105335384 A | 2/2016 |
| TW | 201417537 A | 5/2014 |
| TW | 201523174 A | 6/2015 |

\* cited by examiner

*Primary Examiner* — Masud K Khan

(74) *Attorney, Agent, or Firm* — Umberg Zipser LLP; Ryan Dean

(57) ABSTRACT

The present disclosure provides a method for information storage and a system thereof, which adapts to a data storage system. A monitoring unit is configured to detecting and monitoring operations of a storage node in the data storage system to generate corresponding one and more monitoring data. A recording processor is configured to receiving the one or the plurality of monitoring data, and rendering one or a plurality of logs according to the difference of content of the one or the plurality of monitoring data. The adjustment mechanism is performed according to the stored logs, thereby the amount of large data generated during monitoring is effectively reduced.

6 Claims, 4 Drawing Sheets

METHOD AND SYSTEM FOR INFORMATION STORAGE

CROSS REFERENCE TO RELATED APPLICATION

This application claims the priority benefit of Taiwanese Patent Application Serial Number 109105736, filed on Feb. 21, 2020, the full disclosure of which is incorporated herein by reference.

BACKGROUND

Technical Field

The present disclosure relates to the technical field of a method and system for information storage, particularly to a method and system for information storage in a data storage system.

Related Art

FIG. 1 shows a system block diagram of a conventional storage system 1. The storage system 1 comprises a control management interface 10 and a plurality of storage nodes (such as the first storage node 11, the second storage node 12, and the third storage node 13 of FIG. 1). Each of the plurality of storage nodes comprises a plurality of storage components for storing files, data or software, etc. The storage components can be SSD, IDE or SATA hard drives. A set of the plurality of storage nodes is referred to as a cluster. When the control management interface 10 receives storage information, it will store the storage information in a relatively free storage node according to the storage status of each node. The above control management interface usually applies the SAMBA (free software used to link the operating system of the UNIX series with the SMB/CIFS (Server Message Block/Common Internet File System) network protocol of Microsoft Windows operating system), RBD (Distributed Block Device), and SWIFT monitoring and management methods to optimally adjust the storage status between the plurality of storage nodes and the storage information. The control management interface 10 performs operations such as transferring, copying, or compressing of files, data, or objects between storage nodes according to the storage status of each storage node. Furthermore, it performs reweighting, and monitors and records each operation to generate system monitoring data to maintain each storage node in an optimal operation. The above storage information comprises different types of files, data or objects.

The main focus of the operation stored in the system monitoring mainly lies in the system monitoring data. The system monitoring data is used to predict whether the current storage performance and capacity could meet the future needs, and to allow operation personnel to receive notifications and respond in time when abnormal access of the system is detected. It has been a difficult problem for storage systems that the processing and retaining the large amount of data generated by system monitoring for a long time. When there is too much monitoring data kept, it not only occupies the storage space of the storage system, but the compressed storage of subsequent monitoring data would continue consuming the computing resources of the storage system.

The solutions of prior arts are usually to set a plurality of period parameters in the system. When the monitoring data exceeds a part of the period parameters, the random of all system monitoring data would be reduced, and/or compressed, and/or deleted. Although the amount of monitoring data can be reduced, those data from a long time ago cannot be kept as the solutions of prior arts are inflexible. In addition, the system resources would also be consumed by reducing the random for and/or compressing a large amount of monitoring data, thereby the storage performance of the storage system is reduced.

SUMMARY

The embodiments of the present disclosure provide a method and system for information storage in a data storage system. The monitoring sampling can be adjusted or closed through one or a plurality of monitoring data in the data storage system, thereby the large amount of data generated during monitoring can be reduced.

The present disclosure provides a method for information storage, which adapt to a data storage system, comprising: detecting and monitoring operations of a storage node in the data storage system by a monitoring unit to generate corresponding one and more monitoring data; the storage node comprises a memory, one or a plurality of storage devices, a central processor, one or a plurality of heat dissipating devices, an intranet module, and an extranet module; the intranet module is coupled to the memory, the one or the plurality of storage devices, the central processor, the one or the plurality of heat dissipating devices, and the extranet module; and receiving the one or the plurality of monitoring data by a recording processor; rendering one or a plurality of logs according to the difference of content of the one or the plurality of monitoring data.

In one embodiment of the present disclosure, the method for information storage according to claim 1 further comprising: rendering corresponding logs to the monitoring data respectively; storing the logs of the same type according to the different time, to generate a historical monitoring data having the logs of the same type; and performing adjustment mechanism according to the stored logs.

In one embodiment of the present disclosure, the steps of performing adjustment mechanism according to the stored logs further comprise a plurality of adjustment mechanisms comprising one of the random adjustment mechanism, the threshold adjustment mechanism, and the priority adjustment mechanism.

The present disclosure provides an information storage system adapted to a data storage system, comprising a monitoring unit and a recording processor. The monitoring unit is connected to a storage node in the storage system for detecting and monitoring the operation of the storage node to generate one or a plurality of monitoring data. The recording processor coupled to the monitoring unit, which receives one or the plurality of the monitoring data. The recording processor renders one or a plurality of logs according to the difference of content of the one or the plurality of monitoring data.

In one embodiment of the present disclosure, the recording processor further comprises a log module, a storage module, and an adjustment module. The log module respectively rendering corresponding logs to the monitoring data. The storage module coupled to the log module, storing the logs of the same type according to the different time, to generate a historical monitoring data having the logs of the same type. The adjustment module coupled to the storage module, performing an adjustment mechanism according to the logs stored in the storage module.

In one embodiment of the present disclosure, the adjustment module further comprises a plurality of adjustment mechanisms comprising one of a logic switching adjustment mechanism, a random adjustment mechanism, a recording threshold adjustment mechanism, and a priority adjustment mechanism.

The embodiments of the present disclosure provide a method and system for information storage reducing the stored information. The monitoring sampling can be adjusted or closed through one or the plurality of monitoring data in the system, thereby the large amount of data generated during monitoring can be reduced.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
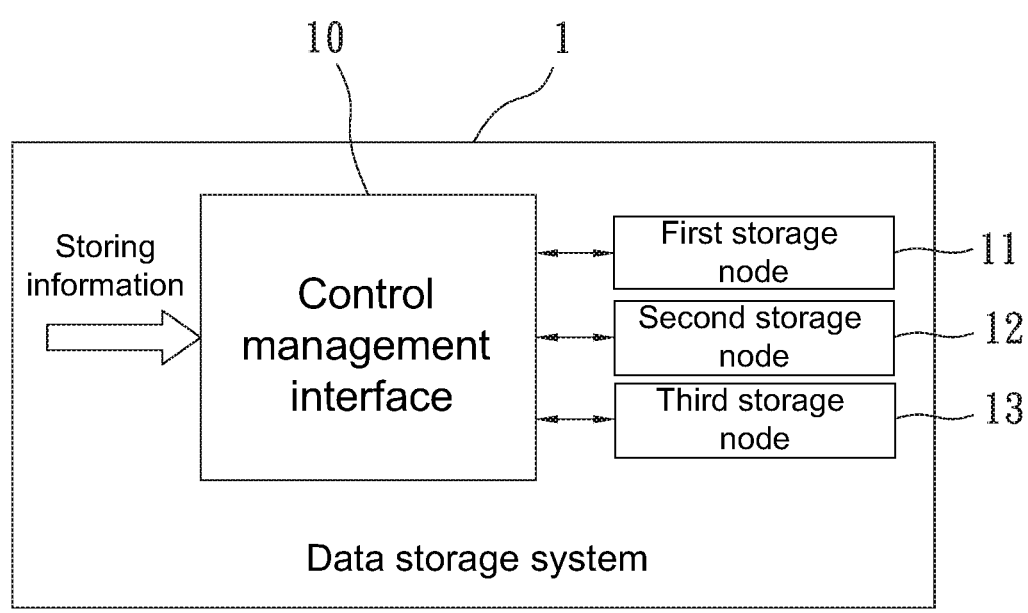
FIG. 1 is a system block diagram of a storage system of a prior art.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an" does not exclude other same elements existing in the process, the method, the article, or the device which includes the element.

In the following embodiment, the same reference numerals are used to refer to the same or similar elements throughout the disclosure.

Figure 2:
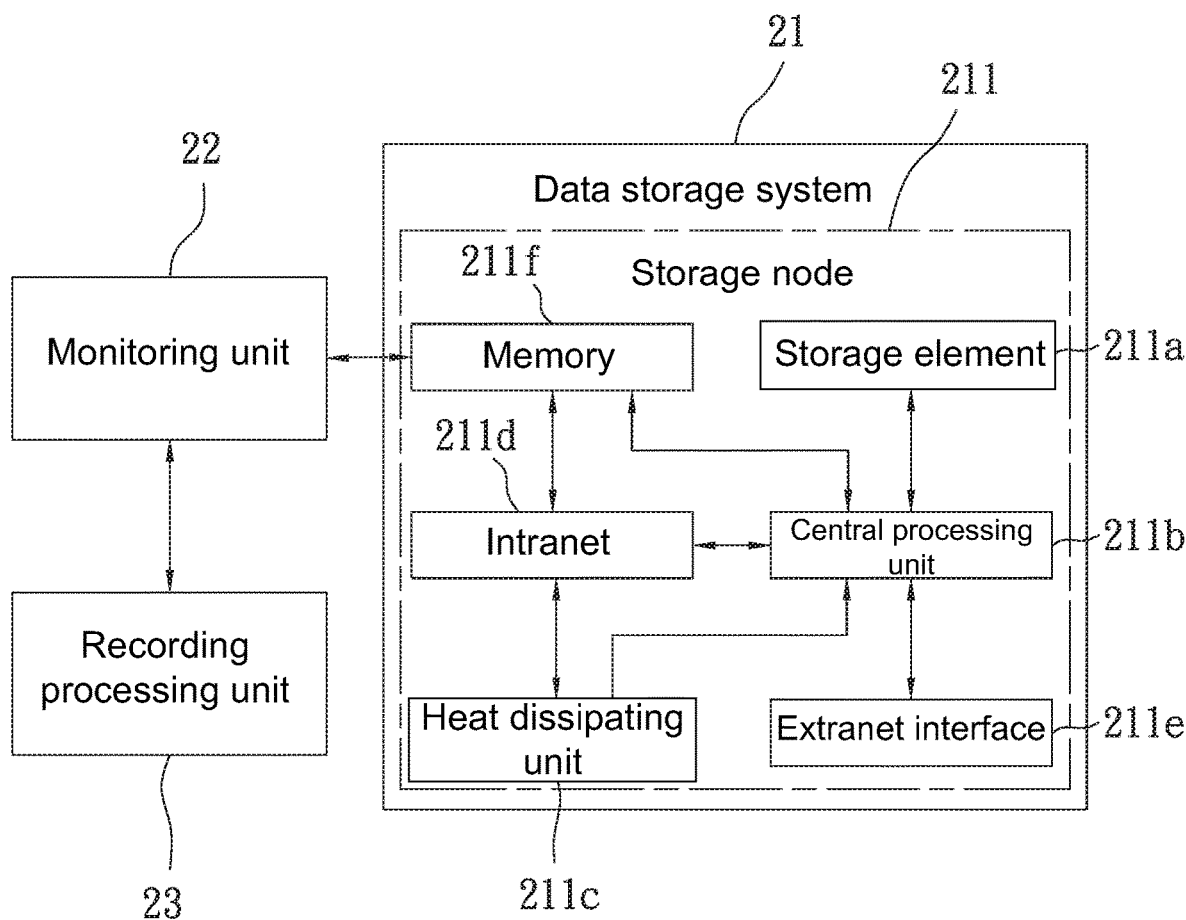
FIG. 2 is a system block diagram of the information storage system of the present disclosure.

FIG. 2 is a system block diagram of the information storage system of the present disclosure. As shown in the figure, an information storage system adapts to a data storage system 21 comprising a plurality of storage nodes. In the figure, one storage node 211 is used as an example. The information storage system comprises a monitoring unit 22 and a recording processor 23.

In one exemplary embodiment, the data storage system 21 could be a storage system with a CEPH storage architecture. The CEPH storage architecture is a single architecture that provides storage of objects, blocks, and files at the same time. With the RADOS function library as an intermediate, the program is possible to directly access the underlying cluster, and provide object storage gateways and block storage devices to correspond to the access. It can also be used with metadata servers to provide file system services. The underlying is composed of a cluster of a plurality of RADOS nodes, which could horizontally expand thousands of nodes.

The monitoring unit 22 is connected to the storage node 211 in the data storage system 21 to detect and monitor the operation of the storage node 211, to generate one or a plurality of monitoring data corresponding to the foregoing operation comprising storage information or shunt information, etc. The record processor 23 is coupled to the monitoring unit 22 and receives one or the plurality of monitoring data. It renders one or a plurality of logs according to the content difference of one or the plurality of monitoring data. The content differences are the difference of the stored data of the monitoring data, the difference of operating time, or the difference of data between other systems or storage status.

The storage node 211 further comprises, but is not limited to, one or a plurality of storage devices 211a, a central processor 211b, one or a plurality of heat dissipating devices 211c, an intranet module 211d, and an extranet module 211e. One or a plurality of monitoring data contents could comprise one of or more of the monitoring data of storage device 211a, the monitoring data of central processor 211b, the monitoring data of heat dissipating device 211c, the monitoring data of intranet module 211d, and the monitoring data of extranet module 211e. The storage node 211 could be a server, and it further comprises a memory 211f communicating with the intranet module 211d. The storage device 211a could be a hard disk such as SSD, IDE, or SATA type. The monitoring data of the storage device 211a can be one of the access operation status, storage capacity, access performance, etc, such as read error rate, search error rate, write error rate, or startup retry error rate. The monitoring data of the central processor 211b could be the operating status, such as power consumption, temperature, actual operation speed or could be the internal system program operation status in the CPU 211b. The monitoring data of the heat dissipating device 211c could be the operating temperature of the central processor 211b. The monitoring data of the intranet module 211d could be the statistics of the internal information traffic. The monitoring data of the extranet module 211e could be statistics of information traffics, etc.

Figure 3:
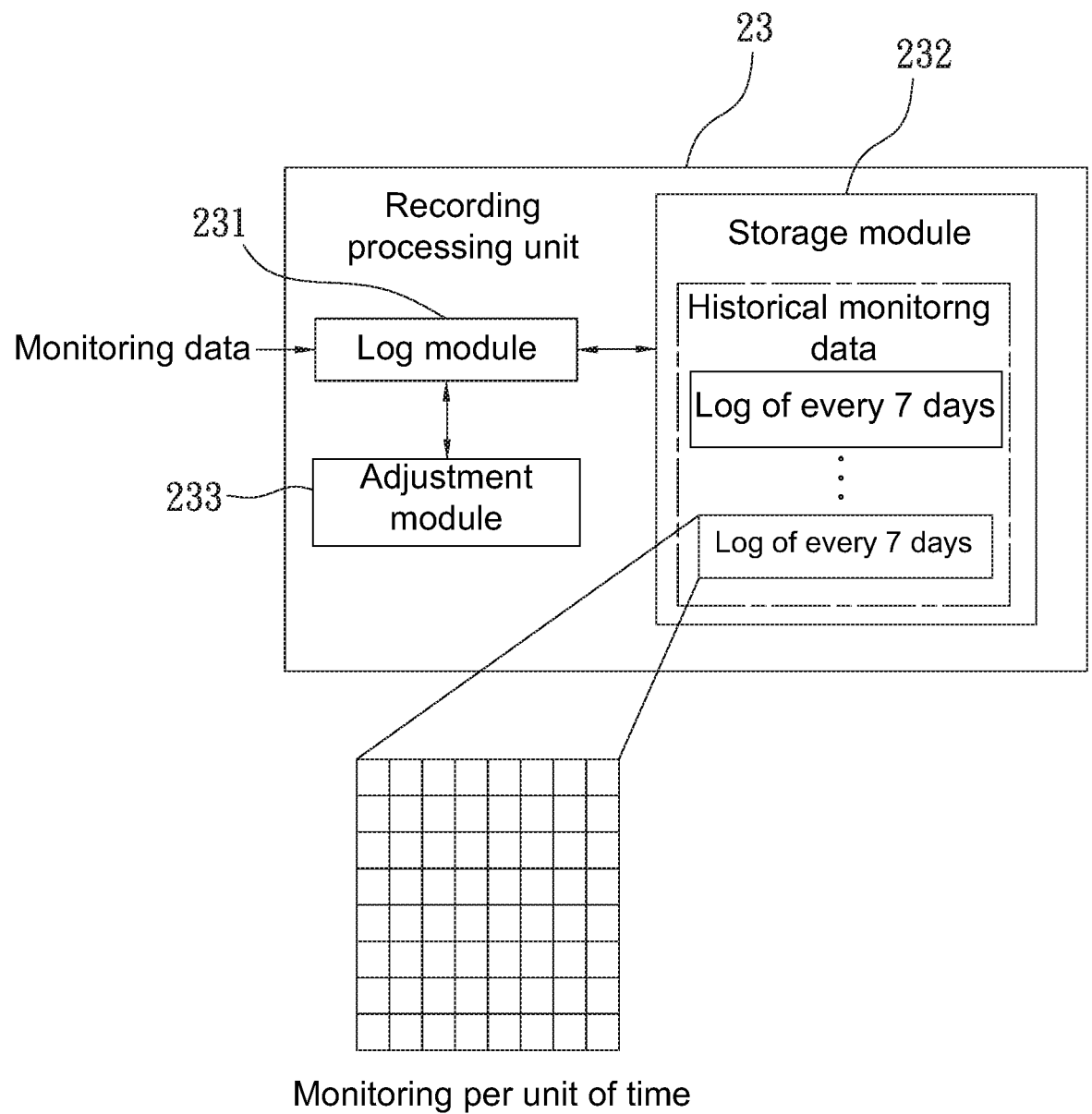
FIG. 3 is a schematic diagram of the detailed internal components of the record processor of the present disclosure.

Refer to the above paragraph and FIG. 3, a schematic diagram of the detailed internal components of the record processor of the present disclosure, the recording processor 23 comprises a log module 231, a storage module 232, and an adjustment module 233.

The log module 231 respectively renders corresponding logs to the content of monitoring data. Practically, the log module 231 renders a first log to the content of monitoring data of the storage device 211a, a second log to the content of monitoring data of the central processor 211b, a third log to the content of monitoring data of the heat dissipating device 211c, a fourth log to the content of monitoring data of the intranet module 211d, and a fifth log to the content of monitoring data of the extranet 211e.

The storage module 232 is coupled to the log module 231 and is configured to store the same type of logs according to the different time, thereby generating historical monitoring data having the logs. For example, the logs would be stored within a period or time. For example, the first log would be stored every seven days and continues the activity for a period of time (eg. 49 days) for the generating of a historical monitoring data corresponding to the first log. Alternatively, it can also to simultaneously store the first, second, third, fourth, and fifth logs every seven days and to continue the activity for a period of time for the generating of the historical monitoring data corresponding to the first, second, third, fourth and fifth logs. In addition, the storage module applies a more minute unit of time, such as hour, to store the first log or other logs, allowing users to clearly understand the actual hour in a certain day that abnormalities occur, to effectively eliminate the problems of the storage node 211 or the storage system 21.

The adjustment module 233 is coupled to the storage module 232, performing adjusting according to the stored logs. For example, the priority adjustments. When the adjustment module 233 or a user notices that an abnormality occurs in the first log, the priority of the first log would be ascended to allow the data storage system 21 or the user to preferentially process and correct the abnormality of the storage device 211a represented by the first log, thereby maintaining the operation of the storage device 211a. The adjustment module 233 further comprises a plurality of adjustment mechanisms, which can be increased according to actual requirements of logs, comprising random adjustment mechanism, threshold adjustment mechanism, and priority adjustment mechanism, etc. When it is noticed that the current log presenting abnormalities, the priority adjustment mechanism gives higher priority to abnormal status than other status to allow the data storage system 21 or the user to preferentially process the abnormalities. The data storage system 21 stores the operation of each status and sets a threshold by the threshold adjustment mechanism. For example, it starts with the normal status for a 0 and the abnormal status for a 20, and the threshold set at 80. When the accumulated abnormalities exceed 80 (threshold), the system would start to process the abnormalities. The random adjustment mechanism is that the data storage system 21 or the user can take randomly sample the status within a certain period or time. When the sample presents abnormality, the data storage system 21 would start processing it. The priority adjustment mechanism, the threshold adjustment mechanism, and the random adjustment mechanism are not limited to the examples described.

In another embodiment, the data storage system 21 could be provided with a plurality of storage nodes 211, each of which is connected to each other by an extranet 211e for communication and transmission. The plurality of storage nodes 211 could also use a gateway (not shown) to communicate with the monitoring unit 22, so that the monitoring unit 22 and the recording processor 23 are able to detect, monitor and establish logs for the plurality of storage nodes 211. The operation and relation between the plurality of storage nodes 211 and the monitoring unit 22, the recording processor 23 is not different from that between the single storage node 211 and the monitoring unit 22, the recording processor 23. Thus, more details would not be described herein again.

Figure 4:
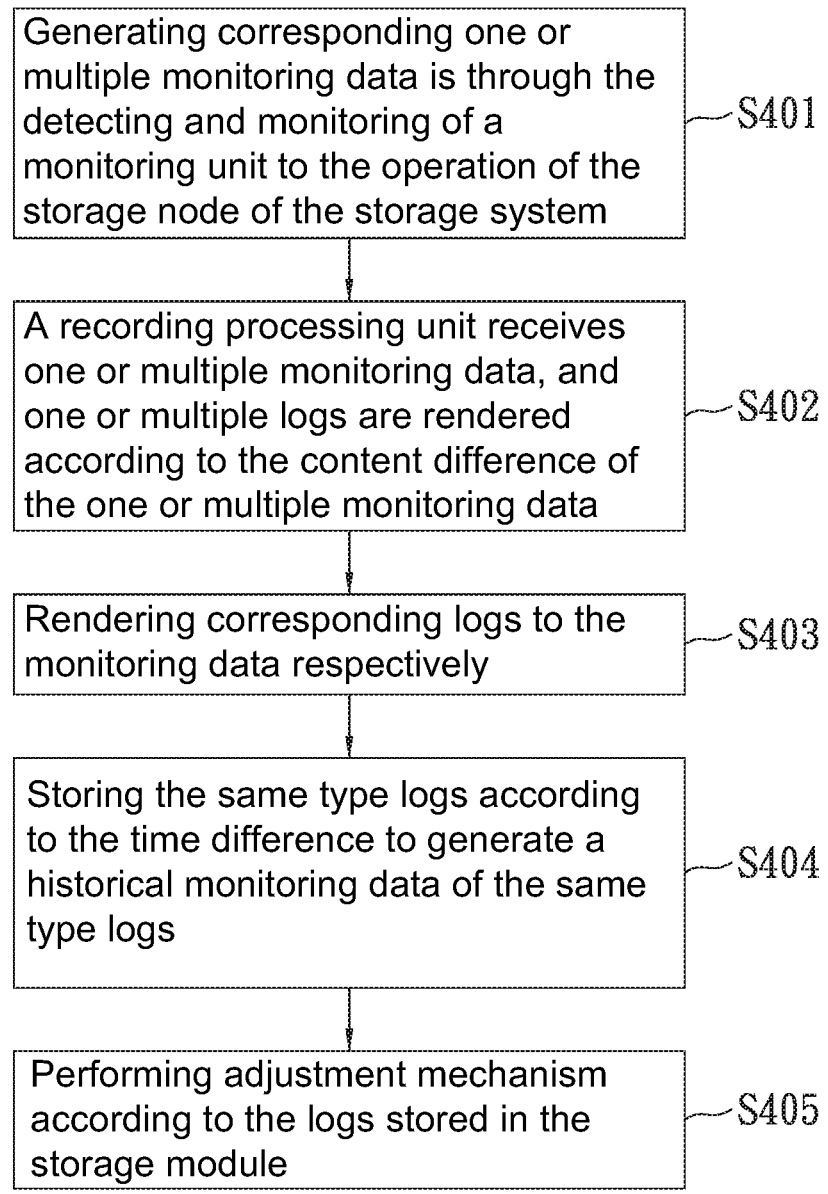
FIG. 4 is a flow chart of the steps of a method for information storage of the present disclosure.

FIG. 4 is a flow chart of the steps of a method for information storage of one embodiment of the present disclosure. Refer to FIG. 2 and FIG. 4, in this embodiment, a method for storing information adapting to the data storage system 21 is presented. In the step S401, the corresponding one or a plurality of monitoring data is generated through a monitoring unit 22 detecting and monitoring the operation of the storage node 211 of the storage system 21. In the step S402, a recording processor 23 receives one or a plurality of monitoring data, and one or a plurality of logs are rendered according to the content difference of the one or the plurality of monitoring data. The storage node 211 further comprises one or a plurality of storage devices 211a, a central processor 211b, one or a plurality of heat dissipating devices 211c, an intranet module 211d, and an extranet module 211e, but is not limited thereto. The content of one or the plurality of monitoring data could comprise one of or more of the monitoring data of the storage device 211a, the monitoring data of the central processor 211b, the monitoring data of the heat dissipating device 211c, the monitoring data of the intranet module 211d, and monitoring data of the extranet module 211e. The storage node 211 can be a server, further comprising a memory 211f which is able to transmit information to the intranet module 211d. The storage device 211a may be a hard disk such as the SSD, IDE, or SATA.

In this embodiment, the method for storing information further comprises step S403 which renders corresponding logs to the monitoring data respectively. In the step S404, the logs of the same type are stored according to the time difference to generate a historical monitoring data having the logs of the same type. In the final step S405, the adjustment mechanism is performed according to the logs stored in the storage module 232. The steps for performing the adjustment mechanism according to the logs stored in the storage module 232 further comprise a plurality of adjustment mechanisms, which is one of the random adjustment mechanism, the recording threshold adjustment mechanism, and the priority adjustment mechanism. When it is noticed that the current log presenting abnormalities, the priority adjustment mechanism gives higher priority to abnormal status than other status to allow the data storage system 21 or the user to preferentially process the abnormalities. The data storage system 21 stores the operation of each status and sets a threshold by the threshold adjustment mechanism. For example, it starts with the normal status for a 0 and the abnormal status for a 20, and the threshold set at 80. When the accumulated abnormalities exceed 80 (threshold), the system would start to process the abnormalities. The random adjustment mechanism is that the data storage system 21 or the user can take randomly sample the status within a certain period or time. When the sample presents abnormality, the data storage system 21 would start processing it. The priority adjustment mechanism, the threshold adjustment mechanism, and the random adjustment mechanism are not limited to the examples described.

In another embodiment, the system is based on a CEPH storage architecture. The plurality of storage servers is provided with a plurality of storage units and a plurality of storage nodes. The plurality of storage servers becomes clusters, and uses the intranet module 211*d* (storage network) for communication, detection, and monitoring to obtain a large amount of system monitoring data. In this embodiment, the monitoring data obtained by the monitoring unit 22 could be a real-time or historical monitoring data, and the one or the plurality of real-time or historical monitoring data can be indicators. The intranet module 211*d* can be an indicator as well as other monitors. It is preferable to take the intranet module 211*d* as an indicator followed by applying judgment methods to adjust or disable other monitoring samples on other monitors, which can effectively reduce the amount of the information generated during monitoring. In addition, the monitoring data obtained by the monitoring unit 22 is possibly come from an intranet module monitor, an extranet module monitor, a storage monitor, a central processor monitor, a memory monitor, a temperature monitor, or a monitor commonly known to those skilled in the art, but is not limited to this. The judgment methods could be threshold setting, pattern basis, or machine learning, etc. The judgment methods to adjust or disable other monitoring samples on other monitors could be a setting method commonly known to those skilled in the art, and is not limited thereto. In this embodiment, it takes the intranet module monitor as an indicator, and applies the threshold setting method to adjust or disable other monitoring sampling logs on other monitors, which effectively reduce the amount of the information generated during monitoring.

In another embodiment, the system is based on an All Flash Array architecture, which applies the SSD as a storage medium with rapid storage speed and highly use of central processing computing resources. In this embodiment, the monitoring data obtained by the monitoring unit 22 could be a real-time or historical monitoring data, and the one or the plurality of real-time or historical monitoring data can be indicators. The intranet module 211*d* can be an indicator as well as other monitors. It is preferable to take the intranet module 211*d* as an indicator followed by applying judgment methods to adjust or disable other monitoring sampling logs on other monitors, which can effectively reduce the amount of the information generated during monitoring. In addition, the monitoring data obtained by the monitoring unit 22 is possibly come from an intranet module monitor, an extranet module monitor, a storage monitor, a central processor monitor, a memory monitor, a temperature monitor, or a monitor commonly known to those skilled in the art, but is not limited to this. The judgment methods could be threshold setting, pattern basis, or machine learning, etc. The judgment methods to adjust or disable other monitoring samples on other monitors could be a setting method commonly known to those skilled in the art, and is not limited thereto. In this embodiment, it takes the central processor monitor as an indicator, and applies the threshold setting method to adjust or disable other monitoring sampling logs on other monitors, which effectively reduce the amount of the information generated during monitoring.

In another embodiment, the system is based on a CEPH architecture, which applies the SSD as a storage medium. In this embodiment, the monitoring data obtained by the monitoring unit 22 could be a real-time or historical monitoring data, and the one or the plurality of real-time or historical monitoring data can be indicators. The intranet module 211*d* can be an indicator as well as other monitors. It is preferable to take the intranet module 211*d* as an indicator followed by applying judgment methods to adjust or disable other monitoring sampling logs on other monitors, which can effectively reduce the amount of the information generated during monitoring. In addition, the monitoring data obtained by the monitoring unit 22 is possibly come from an intranet module monitor, an extranet module monitor, a storage monitor, a central processor monitor, a memory monitor, a temperature monitor, or a monitor commonly known to those skilled in the art, but is not limited to this. The judgment methods could be threshold setting, pattern basis, or machine learning, etc. The judgment methods to adjust or disable other monitoring samples on other monitors could be a setting method commonly known to those skilled in the art, and is not limited thereto. It takes the central processor monitor as an indicator, and applies the threshold setting method to adjust or disable other monitoring sampling logs on other monitors, which effectively reduce the amount of the information generated during monitoring. In this embodiment, it takes the intranet module monitor/or the central processor monitor as an indicator, and applies the threshold setting method to adjust or disable other monitoring sampling logs on other monitors, which effectively reduce the amount of the information generated during monitoring.

In summary, the present disclosure proposed a method and system for information storage, reducing the amount of stored information. With one or the plurality of monitoring data in the system, it is possible to adjust or disable the monitoring sampling to effectively reduce the amount of the information generated during monitoring.

It is to be understood that the term "comprises", "comprising", or any other variants thereof, is intended to encompass a non-exclusive inclusion, such that a process, method, article, or device of a series of devices not only comprise those devices but also comprises other devices that are not explicitly listed, or devices that are inherent to such a process, method, article, or device. A device defined by the phrase "comprising a . . . " does not exclude the presence of the same device in the process, method, article, or device that comprises the device.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A method for information storage, comprising:
   detecting and monitoring operations of a storage node in a data storage system by a monitoring unit to generate corresponding one or a plurality of monitoring data, wherein the storage node comprises a memory, one or a plurality of storage devices, a central processor, one or a plurality of heat dissipating devices, an intranet module, and an extranet module; the intranet module is coupled to the memory, the one or plurality of storage devices, the central processor, the one or plurality of heat dissipating devices, and the extranet module; and the one or plurality of monitoring data obtained by the monitoring unit comes from an intranet module monitor, an extranet module monitor, a storage monitor, a central processor monitor, a memory monitor, and a temperature monitor;

receiving the one or plurality of monitoring data by a recording processor, wherein the recording processor comprises a storage module for data storage;

the recording processor rendering one or plurality of logs according to a difference of a content of the one or plurality of monitoring data;

the recording processor storing the logs of same type every predetermined time period into the storage module;

within a certain period or time, randomly sampling the logs stored in the storage module; and when there is an abnormality in the sampled logs, processing the abnormality;

wherein the data storage system is a single architecture that provides storage of objects, blocks, and files at the same time;

wherein the monitoring unit (i) takes the intranet module monitor and/or the central processor monitor as an indicator, and (ii) adjusts or disables monitoring samples on the extranet module monitor, the storage monitor, the memory monitor, and the temperature monitor, to effectively reduce an amount of the monitoring data generated by the monitoring unit.

2. The method for information storage according to claim 1, further comprising adjusting priorities of the logs to preferentially process the abnormality when there is an abnormality in the logs.

3. The method for information storage according to claim 1, further comprising:
   accumulating a value of the abnormality of the data storage system; and
   when the value of the abnormality exceeds a threshold, processing the abnormality.

4. An information storage system, comprising:
   a monitoring unit connected to a storage node in the information storage system for detecting and monitoring the operation of the storage node to generate one or a plurality of monitoring data, wherein the one or plurality of monitoring data obtained by the monitoring unit comes from an intranet module monitor, an extranet module monitor, a storage monitor, a central processor monitor, a memory monitor, and a temperature monitor; and a recording processor for coupling to the monitoring unit, receiving one or plurality of the monitoring data;

wherein the recording processor comprises a log module rendering one or plurality of logs according to the difference of content of the one or plurality of monitoring data, a storage module coupled to the log module, storing the logs of same type every predetermined time period, and an adjustment module coupled to the storage module, wherein within a certain period or time, the adjustment module randomly samples the logs stored in the storage module, wherein when there is an abnormality in the sampled logs, the adjustment module processes the abnormality;

wherein the information storage system is a single architecture that provides storage of objects, blocks, and files at the same time;

wherein the monitoring unit (i) takes the intranet module monitor and/or the central processor monitor as an indicator, and (ii) adjusts or disables monitoring samples on the extranet module monitor, the storage monitor, the memory monitor, and the temperature monitor, to effectively reduce an amount of the monitoring data generated by the monitoring unit.

5. The information storage system according to claim 4, wherein the adjustment mechanism is configured to prioritize the abnormality; the adjustment mechanism accumulates a value of the abnormality; and when the value of the abnormality exceeds a threshold, the abnormality is processed.

6. The information storage system according to claim 4, wherein the storage node further comprising one or plurality of storage devices, a central processor, one or plurality of heat dissipating devices, an intranet module, and an extranet module.

* * * * *